United States Patent [19]

Bartholic

[11] Patent Number: 5,286,281
[45] Date of Patent: Feb. 15, 1994

[54] SOLIDS-GAS SEPARATION APPARATUS AND METHOD

[76] Inventor: David B. Bartholic, 75 Wetumpka La., Watchung, N.J. 07060

[21] Appl. No.: 981,301

[22] Filed: Jan. 21, 1993

[51] Int. Cl.$^5$ .............................................. B01D 45/12
[52] U.S. Cl. ...................... 95/271; 55/319; 55/346; 55/349; 55/462; 422/144; 422/147
[58] Field of Search ...................... 55/185–188, 55/319, 345–349, 401, 406, 462, 465; 422/144, 147; 95/269, 271

[56] References Cited

U.S. PATENT DOCUMENTS

| | | | |
|---|---|---|---|
| 3,765,153 | 10/1973 | Grey | 55/319 X |
| 3,873,283 | 3/1975 | Hamblin | 55/185 |
| 4,066,533 | 1/1978 | Myers et al. | |
| 4,070,159 | 1/1978 | Myers et al. | |
| 4,285,706 | 8/1981 | Dehne | 55/349 X |
| 4,348,215 | 11/1982 | Dehne | |
| 4,364,905 | 12/1982 | Fahrig et al. | 422/144 |
| 4,859,315 | 8/1989 | Bartholic | |
| 4,985,136 | 1/1991 | Bartholic | |
| 5,221,301 | 6/1993 | Giuricich | 55/545 |

*Primary Examiner*—Charles Hart
*Attorney, Agent, or Firm*—Finnegan, Henderson, Farabow, Garrett & Dunner

[57] ABSTRACT

Apparatus for separating particulate solids from a process gas stream which includes one or more primary separation chambers, preferably ballistic separation chambers, for removing a major portion of the solids entrained in the gas stream. One or more secondary separator chambers containing multi-cyclones are employed for removing substantially all of the remaining solids from the gas discharged from the primary separator chamber. The ballistic separation chamber has an inlet portion and a larger diameter outlet portion, and it may have an arcuate shape to aid in the separation. In one preferred embodiment a plurality of horizontally extending ballistic separation chambers are connected to a top portion of a transport riser, a plurality of the secondary separation chambers having off-gas outlets connected to a cup-shaped off-gas collector housing are positioned above the gas outlets of the ballistic separation chambers and a conical catalyst outlet vessel connected to the solids outlets of the secondary chamber extends downwardly into the transport riser for returning separated solids to a source vessel.

51 Claims, 6 Drawing Sheets

SOLIDS-GAS SEPARATION APPARATUS AND METHOD

FIELD OF THE INVENTION

This invention relates to a method and apparatus for the separation of entrained solid particles from a process gas stream, and more particularly to a fluidized catalytic cracking process employing such a method and apparatus.

BACKGROUND OF THE INVENTION

The fluid catalytic cracking (FCC) unit has been a main processing unit in oil refineries since the 1940's, when the first FCC process was commercialized. Since that time there have been many mechanical and technical improvements in the basic processing system and many processing variations based on fluidization of solid particles have been introduced and commercialized. An inherent problem in all fluidized systems is the control of the particulate effluent, which involves separating the fluidizing media (process gas) and the entrained solid particles.

The original FCC units used small cyclones in the reactor system to separate reaction gases from solids (catalyst) entrained with the gas product from the reactor and returned the catalyst back to the process reactor bed. Because of design considerations, the FCC regenerator recycled solids (catalyst) back to the regenerator from an electrostatic precipitator, which was a principal separation means employed for separating entrained particulates from the regenerator flue gas before venting the flue gas to the atmosphere. As metallurgy and technology improved, the FCC type systems standardized on cyclones as the primary means of separating the circulating solids entrained with the gases from both the reactor and regenerator. Since the late 1940's, the industry standard for the regenerator has been to have two stages of cyclones separating and returning the catalyst to the circulating inventory. The early reactors were designed with only single stage cyclones in the reactor system. Newer FCC reactors have been designed with both single and two stage cyclone systems.

The main problem in design of the cyclone systems for a FCC type system containing a reactor and regenerator is balancing the cyclone efficiencies. That is, the reactor cyclone(s) efficiency, as measured by the size of the particles removed, must be the same or slightly better in the reactor than in the regenerator, as the catalyst losses from the reactor are more difficult to handle than those from the regenerator. In the late 1960's and early 1970's, as more emphasis was placed on environmental considerations and the reduction of particulate emissions from FCC regenerators, the efficiency of regenerator cyclones was improved by the reduction of the gas outlet tube size. However, this improvement in regenerator cyclone efficiency had an adverse effect on the losses from the reactor side and increased the amount of catalyst in the FCC slurry oil. This then resulted in another type of environmental problem; the disposal of increased oily catalyst waste from slurry product tanks. In this same time period there was increased emphasis on increasing FCC plant capacities, so the trend was to go to larger and larger cyclones, which directionally decreases cyclone efficiency and results in higher losses per cubic foot of gas treated.

During the late 1960's and early 1970's, zeolytic catalysts were introduced. This increased the pressure to lower the reactor catalyst losses. With the introduction of zeolytic catalyst, the use of recycle to obtain conversion was not necessary. The use of slurry recycle, which was the method used to recycle reactor catalyst losses back to the reactor system from the slurry settler, was actually discouraged as it resulted in decreased catalytic selectivity and a poorer FCC reactor yield structure.

The pressure, which started in the early 1960's, to increase the capacity of the existing FCC units to their maximum capacity resulted in reaching the mechanical limits on the reactor size. That is, the existing reactor size was not big enough to accommodate any more cyclones or two stages of cyclones. Also, because of the erosive nature of service and, in the case of reactor cyclones, the potential for coking, the industry was not prepared at this time to accept or design cyclones as pressure vessels and to locate the cyclones outside of the reactor or regenerator. Because of these limits, the first riser cracking system was put on stream as a method of reducing the particulate loading of the reactor cyclone system. Since that first riser reactor installation in the early 1970's, there has been a proliferation of ideas for better catalyst and gas separation from the top of the riser. An example of this is the vented riser described in Meyers, et al., U.S. Pat. Nos. 4,066,533 and 4,070,159.

Another critical consideration in the design of both the reactor and regenerator is to design the cyclone systems to maintain a certain particle size in order to maintain circulation and fluidization. As an example, FCC systems employing "U-bends" must operate with a lower Average Particle Size (APS), more in the less than 40 micron APS, than FCC systems that employ shorter and straighter standpipes. For this reason, in particulate fluidization systems the cyclones must have a minimum efficiency. Also, the fresh catalyst supplied must be in a certain particulate size range, as well as meet certain diffusion (activity) and attrition criteria to function in the unit. Thus, the solution to reducing particulate emissions is not as easy as merely using a larger particle.

Recently there have been several notable developments in FCC cyclone technology. One FCC technology is employing external cyclones, but still uses bed rather than transport type two stage regeneration and riser type cracking in the reactor. This type of design has about the same capital requirements as locating the cyclones internally in the reactor and regenerator vessels. When using external cyclones, the FCC units are much more difficult to design because each individual cyclone that was once located inside the reactor and regenerator now becomes a pressure vessel, and while the cyclone inlets and gas outlets can be manifolded, each of the cyclone diplegs must be returned to the vessel. This results in a multitude of cyclone diplegs than need to return the catalyst from each of the first and second stage cyclones back to the vessel at the same elevation in the vessel. These returns and their resulting reinforcing pads usually sets the size (diameter) of the vessel to accommodate the openings, and therefore, there is little or no savings in this type of design.

Another cyclone system of note is the Euripos third stage cyclone described in U.S. Pat. No. 4,348,215. The reasons this system is used as a third stage system and not as a primary or secondary system to separate the catalyst from the effluent gas and return the catalyst to the circulating inventory are two-fold. First there is a definite limit on the particulate concentration (loading) the system can handle without flooding, and bed type regenerators, which is today's prevalent technology, are prone to high particulate concentrations. Secondly the efficiency of the system as described is too high. If one could overcome the particulate loading problem, the second problem of maintaining the desired balance in the reactor and regenerator cyclone efficiencies is a major concern. The concern over potential coking problems in the reactor has eliminated this type of system from consideration for the reactor.

The use of this high efficiency Euripos type system on the regenerator and not the reactor, which would be the same as recycling the tertiary or precipitator fines back to the process unit in today's state of the art units, would result in increased catalyst losses from the reactor because of the imbalance of the cyclone efficiencies. Also, it is often believed that the increased barrel velocities, which are the source of the increased efficiencies of the smaller cyclones, will result in increased attrition and higher catalyst losses if used On the circulating inventory.

Besides decreasing the gas outlet tubes for increased efficiency, the industry has been using the same cyclone technology in both the reactor and regenerator since the 1950's, and coping in different ways with the reactor catalyst carryover into the slurry product.

Thus, a general objective to the present invention is to overcome the aforementioned and other related problems in prior art systems for separating particulates from process gas streams.

A primary object of the present invention is a method and apparatus for controlling particulate emissions in a system employing a gaseous fluidizing media to transport particulate solids.

Another object of the invention is an improved solids-gas separation system which achieves an increased efficiency of particulate removal from a fluidized solids process stream.

Still, another object of the invention is a solids-gas separation system which enables decreased capital requirements when employed in a process unit using a gaseous fluidizing medium to transport particulate solids.

Yet, another object of the invention is an FCC or 3D type (as hereinafter described) processing system which utilizes only one stage cyclones, as compared to current state of the art processing systems utilizing two stages of cyclones, to achieve a very low level of particulate solids in regenerator flue gases exhausted to the atmosphere and/or in reactor effluent vapors.

Other objects and advantages of the present invention will become apparent from the following description thereof and from the practice of the invention.

SUMMARY OF THE INVENTION

The present invention utilizes only one stage of cyclones, as compared with the current state of the art which utilizes two stages of cyclones, and results in decreased capital requirements and an increased particulate removal efficiencies when applied to both the reactor and regenerator systems of an FCC type or 3D type (as hereinafter described) processing systems. This invention is best utilized on fluidized combustion devices, such as fluid cokers, FCC regenerators, ART burners, 3D regenerators, or fluidized bed boilers, where one contacts a fluidized solid with combustion air and maintains a fluidized bed, or transport solid systems where the solids and combustion gases must be separated before releasing the flue gases to the atmosphere. It is also applicable to FCC type reactor systems including bed, riser or MSCC (as hereinafter described) type systems to separate the reactor effluent vapors from the entrained catalyst.

To achieve the objects and in accordance with the purposes of the present invention there is provided an apparatus for separating particulate solids from a process gas stream, which apparatus comprises a ballistic separation chamber comprising: a first chamber portion having a first end portion in which there is positioned an inlet means for introducing thereinto a process gas stream containing entrained solid particles; a second chamber portion joined to and in flow communication with the first chamber portion so as to provide in the chamber a flow path extending from the inlet means toward a second end portion, the second chamber portion having a cross sectional flow area greater than that of the first chamber portion and having the second end portion spaced downstream from the junction of the first and second chamber portions; solid particle outlet means positioned in the second chamber portion intermediate the junction and the second end portion for removing therefrom a stream rich in separated solid particles; gas outlet means positioned in the separation chamber intermediate the inlet means and the solid particle outlet means for removing therefrom a stream rich in process gas; and baffle means arranged in the separation chamber between the inlet means and the gas outlet means for directing the process gas stream and entrained solid particles introduced through the inlet means along the flow path past the gas outlet means.

In another embodiment of the present invention there is provided apparatus for separating particulate solids from a process gas stream, which apparatus comprises: a primary inlet means for introducing into the apparatus a process gas stream containing entrained solid particles received from a source vessel; a primary ballistic separation chamber in flow communication with the primary inlet means for receiving the gas stream and entrained solid particles introduced thereinto and effecting therein a ballistic separation of a major portion of the solid particles from the process gas; the primary separation chamber comprising (1) a first chamber portion having a first end portion in which the primary inlet means is positioned and (2) a second chamber portion joined to and in flow communication with the first chamber portion, having a cross sectional flow area greater than the of the first chamber portion and positioned downstream from the primary inlet means; a secondary separator chamber for receiving a process stream containing a minor portion of the solid particles from the second chamber portion, the secondary separator chamber having a secondary inlet means providing direct flow communication between the secondary separator chamber and the second chamber portion; a plurality of cyclone separators positioned within the secondary separator chamber for receiving process gas and entrained solid particles entering the secondary separator chamber and for separating substantially all of the solid particles in the process gas entering the secondary separator chamber; a secondary solid particle outlet means in the secondary separation chamber for removal therefrom of solid particles separated from process gas by the cyclone separators; off-gas outlet means in the secondary separator chamber for removing therefrom process gas substantially free of the solid particles; and primary solid particle outlet means in the second chamber portion intermediate the junction of the first and second chamber portions and a second end portion of the second chamber portion remote from the first end portion for removal of the major portion of the solid particles separated from the process gas in the primary separation chamber.

In accordance with an especially preferred embodiment of the present invention, the above ballistic, or primary, separator chamber is an elongated, generally horizontal vessel which is curved along its longitudinal axis to provide an arcuate flow path so as to enable the utilization of centrifugal force to further enhance the efficiency of the gas-solids separation therein. Such an arrangement facilitates the incorporation of the apparatus of the invention into existing vessels of a processing unit since the primary separator length and diameter can conform to a circular vessel, while improving the efficiency of separation, facilitating the designs and layout either inside or outside of a process vessel and enabling the use of preferred straight lines for returning the separated solid particles to a source vessel.

Another preferred embodiment of the invention provides an apparatus for separating entrained particulate solids from a fluidizing gas, which apparatus comprises primary separation means for separating a major portion of the entrained solids from the gas and producing an upwardly flowing primary separated gas containing a remaining minor portion of the entrained solids, and secondary separation means positioned above the primary separation means for receiving the primary separated gas, removing substantially all of the remaining solids from the primary separated gas and producing an off-gas having a reduced solids content, the secondary separation means including, an off-gas collector housing having an off-gas outlet for discharging the gas substantially free of the solids, a plurality of secondary separation chambers each having a secondary gas inlet for receiving said primary separated gas, a secondary gas outlet in flow communication with the off-gas collector housing and a secondary solids outlet for discharging therefrom substantially all of the remaining solids, and multiple cyclonic separators in each of the secondary separator chambers for effecting the separation of the remaining solids from the primary separated gas. Preferably, the off-gas collector housing is cup-shaped and positioned over a conical secondary solids outlet vessel for receiving the remaining secondary solids. Advantageously, the herein described ballistic separator chambers are used for the primary separation and these are positioned near the top of a transport riser.

BRIEF DESCRIPTION OF THE DRAWINGS

The present invention will be described hereinbelow with reference to the accompanying drawings, wherein like numbers designate like parts of the apparatus illustrated in each of the Figures and wherein.

DESCRIPTION OF PREFERRED EMBODIMENTS

The Discriminatory Destructive Distillation (3D) Process and the Milli-Second Catalytic Cracking (MSCC) Process are described in my U.S. Pat. Nos. 4,985,136 and 4,859,315, respectively, both of which are incorporated herein by reference. Those processes have resulted in a reactor contacting method that greatly reduces the size (diameter) of the reactor vessel when compared to today's design and greatly reduces the size (diameter) of the regenerator vessel.

A purpose of the present invention is to permit the ultimate use in the 3D and MSCC process technologies of a unique catalyst/solid separation system in the regenerator and reactor that will enable a reduction in the size of both the reactor and regenerator vessels and the elimination of one complete stage of cyclones. This unique system will also enable the reduction of the number of catalyst return pipes to three for any size unit, compared to conventional technology using one dipleg per cyclone for return of the particulates to the process vessel, when utilizing external cyclones, greatly reduces the complexity of design and lowers the capital investment. This same unique system is also useful in the reactor and enables increased efficiency of both the reactor and regenerator, when compared to today's state of the art. This will translate into lower particulate emissions from both the reactor and regenerator of these and other fluidized solids systems.

As an example, the 3D Process, employed for upgrading residual oil or heavy crudes, utilizes the asphaltene molecule in the feed as the source of energy for vaporizing the feed. Therefore, the coke yield is usually equal to or less than the Conradson Carbon in the feed. If one were to design a 3D unit to process 50,000 BPD of Maya crude containing 10% Conradson Carbon in a conventional manner (i.e. a regenerator containing two stages of conventional cyclones), the regenerator diameter would need be about 70 feet to accommodate at least 16 sets of the largest two stage cyclones (68 inch diameter barrels) produced. If these same cyclones were placed outside the unit as pressure vessels, the regenerator diameter would still need to be about 50 feet to accommodate all of the dipleg returns. However, if one designed this same system as described in the above patents the regenerator diameter would be about 20 feet. This latter size would not permit the use of conventional cyclone technology.

The present invention provides a novel and continuous process and apparatus useful, e.g., in an FCC process for separating the regenerator flue gas from the particulates in the flue gas and returning the particulates to the circulating inventory. The present invention involves a primary separation of the particulate solids from the vapors based upon horizontal ballistic separation of the particles from the vapors prior to the vapors entering a secondary cyclone-type separation device. The secondary separation device is based upon the use of a multiple of small cyclones which are larger than those used in the Europis third stage cyclone described in U.S. Pat. No. 4,348,215 but smaller than those used in commercial FCC reactor and regenerator systems.

Figure 1:
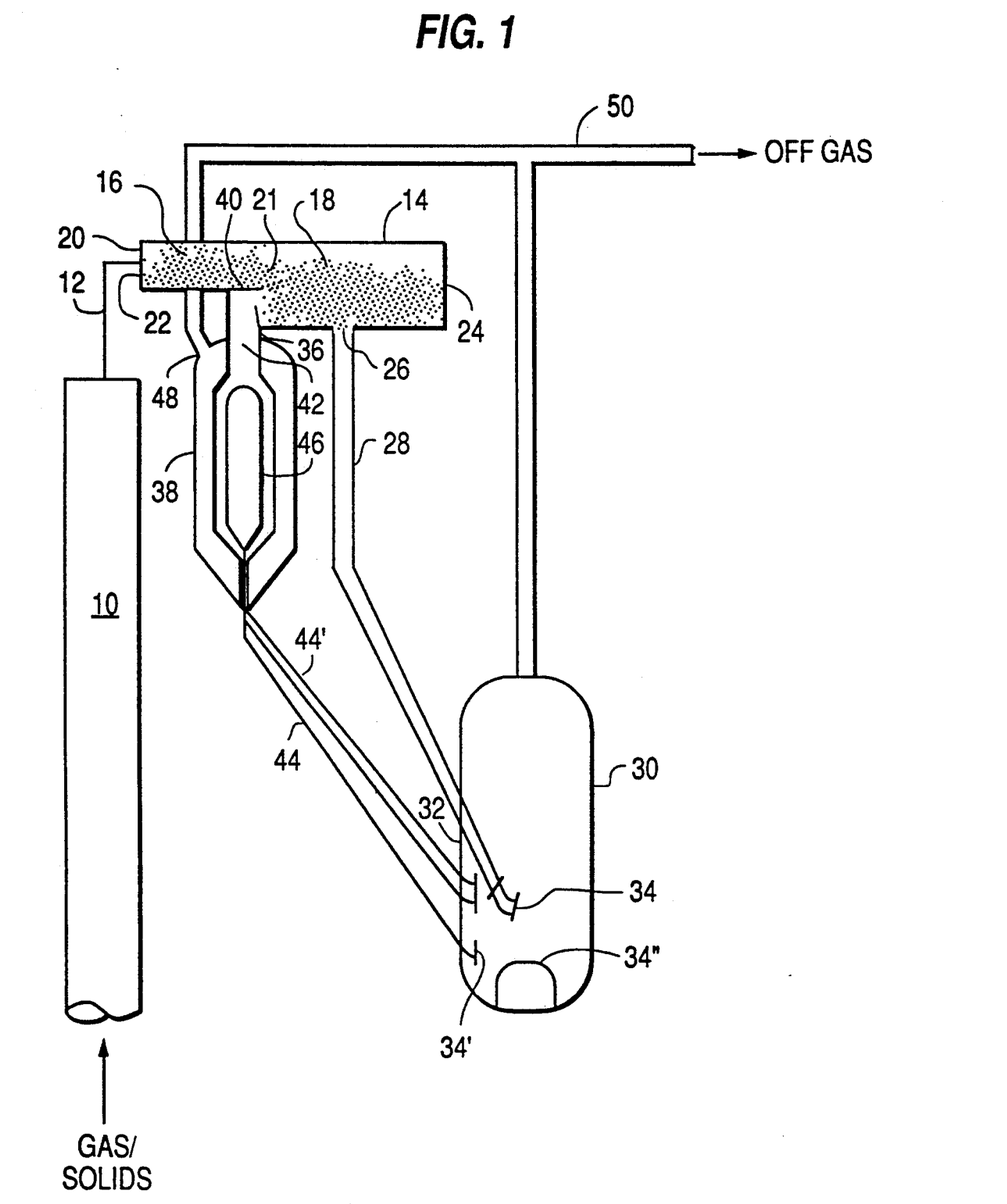
FIG. 1 schematically illustrates a first embodiment of the present invention wherein the gas-solids separation apparatus is installed external of a process vessel.
Figure 2:
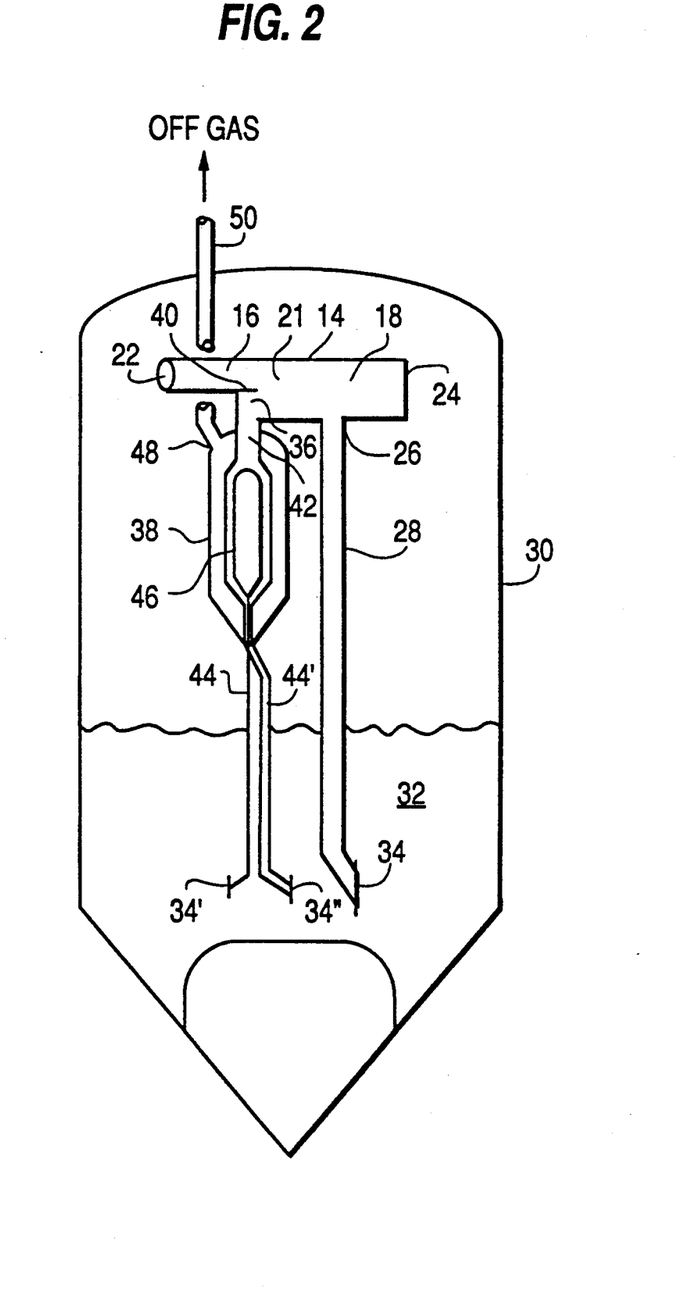
FIG. 2 schematically illustrates a second embodiment of the present invention wherein the gas-solids separation apparatus is installed internally in a process vessel.

One embodiment of the present invention is shown in FIG. 1, which depicts the use of the present invention in an external system near the top of a transport riser, but one skilled in the art will realize that the system of the present invention may be installed inside another vessel as shown in FIG. 2 if so desired. Also, the embodiment shown in FIG. 1 may be installed in another vessel which houses conventional vertical cyclones where the gas outlet of the present invention is upward and not directly connected to the vertical cyclones.

As shown in FIG. 1, a fluidized mixture of effluent process gas and entrained catalyst/solids flows upwardly and exits the upper portion of a source vessel 10, e.g., a riser reactor of an FCC unit through a line 12, which may be either horizontal or vertical. The catalyst/solids entrained in the effluent process gas can be either the total catalyst/solids circulation, entrained material from a fluidized bed or from a previous stage of separation or a mixture of these as might be the case in multiple vessels. Because of mechanical considerations, the preferred method is to employ a horizontal primary ballistic separation chamber 14, but those skilled in the art will realize that a vertical system will also perform almost as well and the actual configuration may be dictated by mechanical considerations.

The primary ballistic separation chamber 14 comprises a first chamber portion 16 and a second chamber portion 18 positioned downstream of the first chamber portion. The primary separation chamber 14 may extend generally horizontal, slope downwardly (so that incoming solids flow downwardly toward the primary solids outlet 26) or extend downwardly, but it should not be positioned so that the incoming solid particles flow upwardly. The second chamber portion is joined to and in flow communication with the first chamber portion which has a first end portion 20 in which is positioned a primary inlet means 22, such as an opening, connected to line 12 for introducing a stream of fluidized solid particulates and process gas into the chamber 14. The solids/gas stream preferably contains not more than about 7, and most preferably contains from about 0.3 to about 5.0 pounds of solid particles per cubic foot of gas. The fluidized solids/gas stream is introduced into the first chamber portion at a velocity of from about 40 to about 200, and *preferably from about 70 to about* 120, *feet per second.*

The first and second chamber portions are elongated vessels in flow communication with each other to provide, a flow path in the chamber 14 extending from the primary inlet 22 toward a second end portion 24 of the second chamber portion 22 which is located downstream from the junction 21 of the first and second chamber portions at a distance sufficient to permit a major portion of the entrained solid particles to separate in the second chamber portion from the solids/gas stream.

The second chamber portion 18 has a cross-sectional flow area sufficiently greater than that of the first chamber portion 16 so the velocity of the solids/gas stream flowing in the second chamber portion is reduced to a level at which, in combination with the distance from the junction of the two chamber portions to the second end portion, a major portion, preferably at least about 80%, of the entrained solids separate from the solids/gas stream as it passes through the second chamber portion.

Referring to FIGS. 1 and 2, the second chamber portion is provided in a lower portion thereof with a primary solid particle outlet means 26, such as an opening in the bottom of the chamber, for withdrawing therefrom a stream rich in separated solid particles for return to the process source through line 28, e.g., a dip-leg, connecting the solids outlet means 26 and the process source vessel, e.g., an FCC unit regenerator. As shown in FIGS. 1 and 2, the dip-leg 28 extends into a lower portion of FCC regenerator 30, the lower end of the dip-leg extends into the regenerator catalyst bed 32 and its lower end is sealed by, e.g., a vertical flapper valve 34 or a horizontal counter weighted valve. The solid particle outlet means 26 is positioned intermediate the junction of the first and second chamber portions 16 and 18 and the second end portion 24 and spaced from the second end portion at a distance which permits the separated particulates to fall to the bottom of the second chamber portion near the second end portion and flow by gravity through the primary solid particle outlet means 26 into solids withdrawal line 28. The cross sectional flow area of the inlet (the upper portion) of line 28 preferably is larger, most preferably at least about 10 times larger, than the cross-sectional flow area of the lower portion of line 28 to aid in de-gassing the downwardly flow solids.

The second chamber portion 18 is also provided with a gas outlet means 36 positioned in the chamber 14 adjacent the junction 21 and intermediate the primary solids/gas inlet 22 and the primary solid particle outlet opening 26, for withdrawing from chamber 14 a stream rich in process gas and from which solids have been separated and passing the gas-rich stream to a secondary separation chamber 38 wherein a further solids-gas separation is effected as described hereinbelow.

Figure 3A:
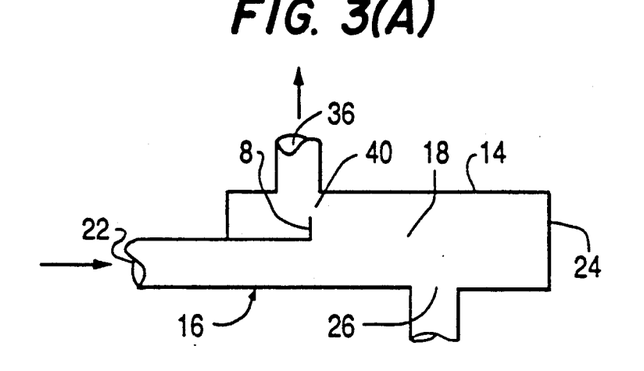
FIG. 3(A) schematically illustrates an embodiment of the ballistic separation chamber of the present invention wherein the gas outlet is located in a top portion thereof.

While, as shown in FIG. 3(A), the second chamber portion 18 may be positioned above the first chamber portion 16 with the gas outlet means 36 in the top of the chamber 14, it is sometimes preferred that the second chamber portion be below the first chamber portion and the gas outlet means be positioned in the bottom thereof, as shown in FIG. 1, since the latter arrangement results in greater efficiency. In either case, it is important that a baffle means 40 be arranged in the primary separation chamber 14 between the primary inlet 22 and the primary gas outlet 36 for directing the solids/gas stream from the first chamber portion past the primary gas outlet 36, so that the heavier solid particles are "shot" past the gas outlet toward the second end portion 24 and can separate from the stream in the second chamber portion 18, and the resulting stream containing a reduced amount of solid particles passes through the gas outlet 36 and into the secondary separation chamber 38.

Whether the gas from the primary separation chamber exits from the top or the bottom thereof, the primary inlet 22 is taken from the opposite side of the baffle 40. Also, the actual location of the secondary separation chamber relative to the primary separation chamber is not critical (i.e. it is the outlet from the primary separation chamber which is important). The secondary chamber can be located at any convenient position.

Figure 3B:
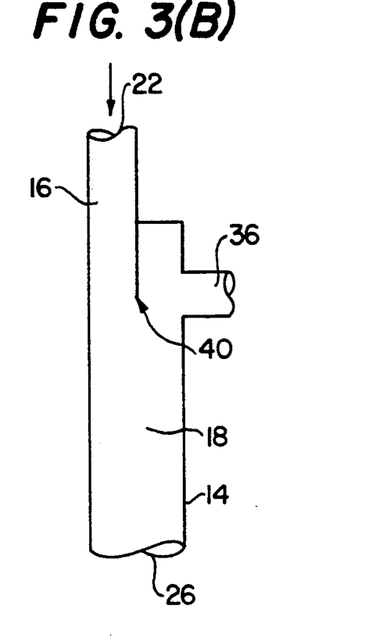
FIG. 3(B) schematically illustrates an embodiment of the ballistic separation chamber of the present invention wherein the chamber is vertical and the gas outlet is located on one side thereof.

In an embodiment, as shown in FIG. 3, the ballistic separation chamber 14 may be a vertical chamber wherein the primary solids/gas inlet means 22 is positioned above the vertically extending first and second chamber positions 16 and 18. In this vertical ballistic separation chamber the baffle 40 extends downwardly past the gas outlet means 36 and intermediate the primary inlet means 22 and the primary gas outlet 36. As before, a major portion of the entrained solids passes downwardly, past baffle 40, through the second chamber portion 18 and exists the chamber 14 through solid particle outlet means 26 at the lower end of chamber 14, which a stream rich in process gas and from which solids have been separated passes upwardly on the side of baffle 40 opposite inlet means 22 and exists the chamber 14 through the primary gas outlet 36.

Figure 4:
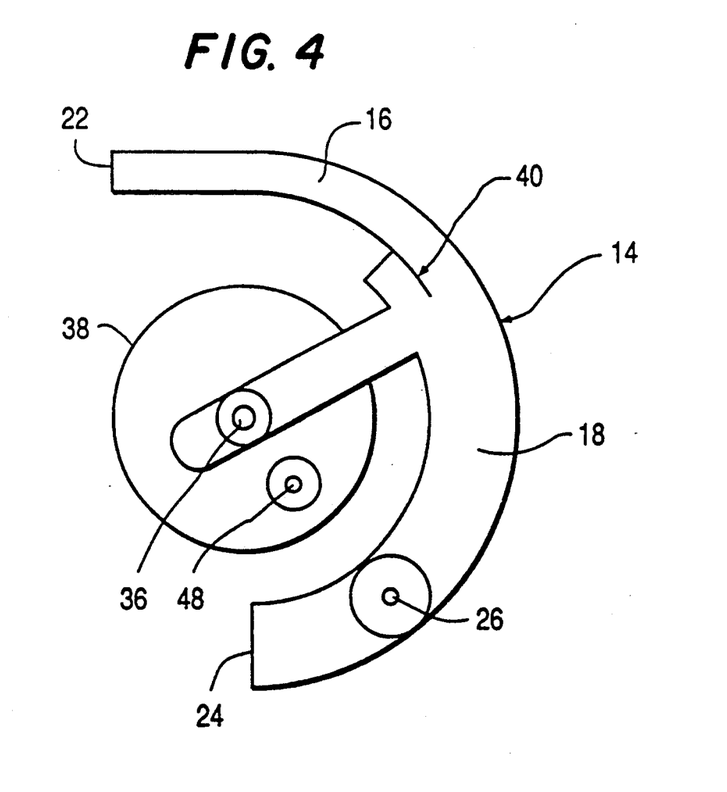
FIG. 4 schematically illustrates a top view of an embodiment of the ballistic separation chamber of the present invention wherein both ballistic and centrifugal forces are employed to separate entrained particulate solids from a process gas stream.

FIG. 4 illustrates a preferred embodiment of the "ballistic separator" wherein, to increase the separation efficiency, ballistic separation is combined with centrifugal separation. This system uses centrifugal separation to force the particulates/solids entering with the process gas into primary inlet 22 from line 12 to concentrate at the outer wall in primary separator 14, in both the first chamber portion 16 and the second chamber portion 18, so that less solids will be entrained in the gas exiting on the inside radius of primary separator 14 through gas outlet 36 and into secondary separator chamber 38 through secondary inlet 42. The system shown in FIG. 4 is especially preferred as it is easy to incorporate into existing vessels since the primary separator 14 length and radius can be conformed to a circular vessel, it will be much more efficient than the straight horizontal system shown in FIGS. 1-3, and it will be easier to design and layout either inside or outside of a vessel and easier to maintain straight solids return lines to the process, which is preferable.

Figure 5:
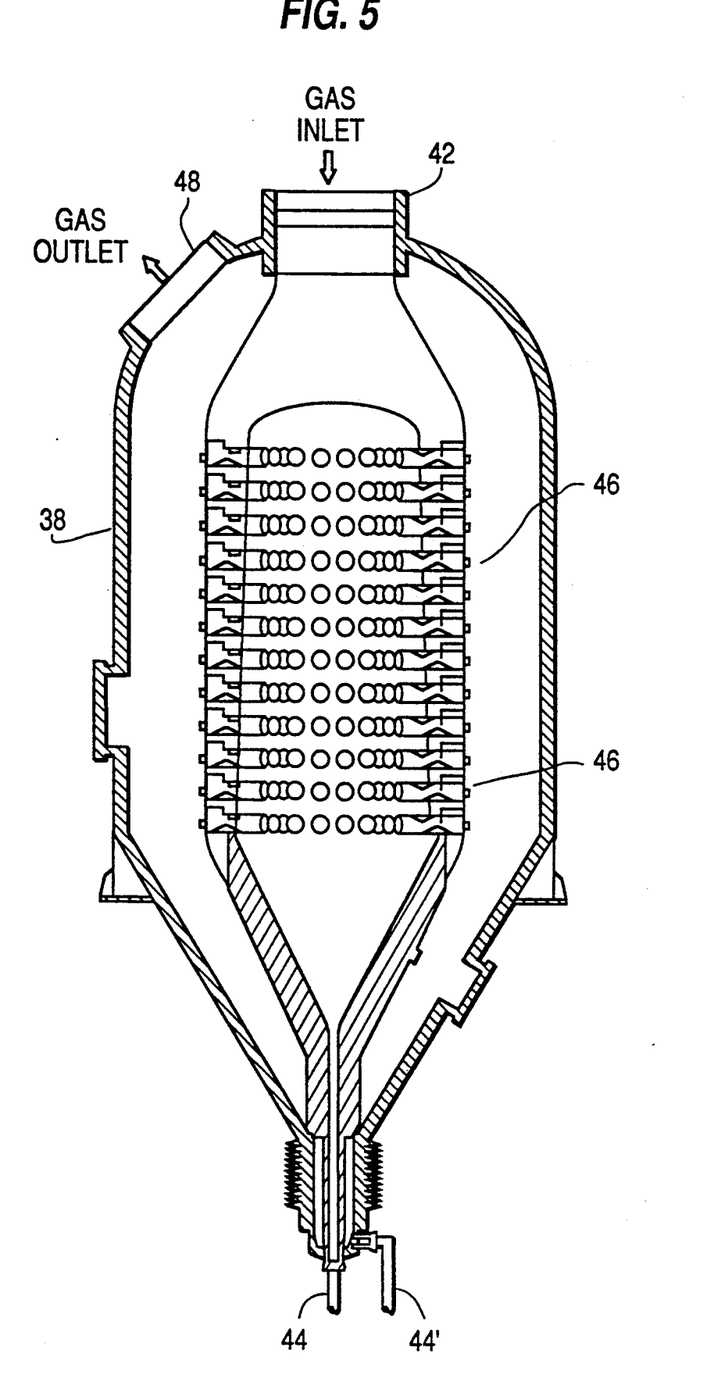
FIG. 5 is cut-away side view of a horizontal cyclone apparatus within a secondary separator chamber which may be used in accordance with the present invention.

As shown in FIG. 5, the secondary separation chamber 38 is provided with a secondary gas inlet 42 in the top portion which is in flow communication with the primary gas outlet 36 of the primary chamber 14. Process gas and the remaining entrained catalyst pass through inlet 42 and enter horizontal cyclones 46 on the interior of secondary separation chamber 38 which separate substantially all of the remaining entrained solids from the process gas. The solids/gas stream entering gas inlet 42 contains a minor portion of the total solids entrained in the solids/gas stream from line 12 and, preferably not more than about 0.5 pounds of solid particles per cubic foot of the solids/gas stream. The off-gas stream, cleansed by cyclones 46 of substantially all of the solid particles and preferably containing not more than about 0.0005 pound of solid particles per cubic foot, exits the secondary separation chamber 38 through off-gas outlet 48 connected to vent line 50 which vents the off-gas to the atmosphere. The separated solids are collected and discharged from chamber 38 into return line 44 and returned to the source vessel 30.

The multi-cyclone (multi-clone) system depicted in FIG. 5 is a Cytrol Separator which is available from EMTROL Corp. of Hauppauge, N.Y.; however, other multi-clone systems such as the aforementioned Europis cyclones may be used in the secondary separator.

The number of cyclones 46 used in secondary separation chamber 38 will depend on the volumetric flow rate and the diameter of the cyclones will vary to match existing cyclone efficiencies. For systems that are stand alone like fluidized bed boilers and lime stone scrubbers, the diameter of the cyclones will be less than 10 inches for maximum efficiency. For systems that need to match another cyclone system such as an FCC reactor utilizing conventional cyclones, the cyclone(s) diameter will be between 8 and 67 inches, depending on the whether the reactor utilizes single stage or two stage cyclones and their efficiency.

Typically, the multi-clone system shown in FIG. 5 is designed for catalyst solids loadings of 0.0001 pound per actual cubic foot of gas. As the diameter is increased to approximately 24 inches, this loading can be increased to from about 0.15 to 0.50 pound per cubic foot without flooding. Therefore, the primary separation chamber should be able to decrease the typical FCC regenerator or reactor gas loading from a normal 1 to 2 pounds per actual cubic foot of gas to a range which will not flood the smaller cyclones. This requires that the first chamber portion 16 velocity probably be greater than 40 fps and less than 200 fps. The internal baffle 40 should be equal to or extend downstream along the flow path slightly past primary gas outlet 36 to prevent short circuiting of the gas flow. The distance from the end of the baffle 40 to the intersection of the primary solids outlet 26 should be a minimum of one pipe diameter, with a three pipe diameter distance preferred. The length of the second end portion 24 should be a minimum of one pipe diameter, i.e., the diameter of the second chamber portion 18, with 1.5 diameters preferred. These dimensions will allow for the catalyst to be propelled into the second chamber 18 from the first chamber portion 16 and to deaerate and flow by gravity into return pipe 28 while the effluent gas without the majority of the entrained catalyst/solid turns and enters secondary separation chamber inlet 42. The catalyst/solids in return pipe 28 is returned to the process.

The final clean up of the process gas is accomplished in multi-clone system which, in a preferred embodiment are installed horizontally, consists of cyclones up to 35 inches in diameter to match the efficiency of the other cyclones in the processing circuit. As shown, the treated process gas exits the secondary separator vessel 38 through secondary gas outlet 48 connected to off-gas line 50. The separated catalyst from the cyclones in secondary separator 38 exits by gravity from the bottom of the separator through lines 44 and 44' to return to the process.

The system in accordance with the present invention will easily handle upsets in solids loading because of the increased stability offered by the inclusion of the first chamber portion 16 and the second chamber portion 18 in the primary separator 14.

The use of the above-described horizontal multi-cyclone system will require two lines from the bottom of the secondary separator vessel to pipe, the debris and catalyst surge discharge (through line 44,) and the separated catalyst discharge (through line 44) back to the process, and these lines are sealed at the bottom in a dense bed of catalyst or with a sealing valve 34, 34', 34" (trickle valve or counterweighted flapper valve) as shown in FIGS. 1 and 2. FIG. 1 shows the installation of the system external to the process vessel and integrated into a fluid system as described for the regenerator in the above-mentioned 3D and MSCC patents. This external system could also be used on fluidized bed as shown in FIG. 2 by returning the three catalyst return lines back to the bed with external connections. FIG. 2 shows the integration of the system into a typical dense bed regenerator system or a reactor system, which could be a riser cracking system, a MSCC type system or another fluid bed system.

For a separator that uses typical cyclones installed in a vertical position there would only be one (not two) catalyst return line from the bottom of the separator to the circulating inventory.

As an example of the design of the improved solids-gas separation system in accordance with the present invention for a process unit that is using 100,000 acfm (actual cubic feet per minute) of process gas to fluidize particles of an average particle size of 75 microns, an apparent bulk density of 55 $\#/ft^3$ (pounds per cubic foot), and a skeletal density of around 150 $\#/ft^3$, such that the particulate loading into the inlet of the improved separator is 1.0 $\#/ft^3$ is as follows:

The separator can be located either internal or external to the process vessel. For this example, the separator is assumed to be located external to vessel 10 as shown in FIG. 1. Vessel 10 is a transport type riser system. The 100,000 acfm of fluidizing gas and particles exits vessel 10 through conduit 12, which is normally circular, but for low pressure operations could be a square or rectangular duct. The particulate laden gas enters primary separator 14, through first chamber portion 16, an upper circular conduit which is 55 inches ID and 150 inches long. This length includes baffle 40. The particles exiting the first chamber portion are propelled into the second chamber portion 18, the larger end of the primary separator 14 (80 inch ID) with such a forward force that they are not entrained with the gas as it turns to exit the primary separator through primary gas outlet 36 and secondary separator inlet 42, which is at least 55 inches ID. The particles are propelled past conduit 28, which is located 120 inches from the outlet of first chamber portion 16 and is 47 inches ID, into second chamber portion 18, which is 100 inches long and 80 inches ID, where the particulates deposit and flow by gravity into return pipe 28.

The gas and residual particles entering multi-cyclone inlet 42 flow downward into secondary separation chamber 38, which houses the cyclones. The size of this vessel will depend on the type, number, and layout of the cyclones. For a unit employing a multiplicity of essentially horizontal cyclones, this vessel would be about 200 inches ID and 540 inches long. The particulates separated from the gas exits vessel 38 through conduit 44, which is 47 inches ID, and the essentially particulate free gas exits vessel 38 through secondary gas outlet 48 and line 50, which is 55 inches ID.

Figure 6:
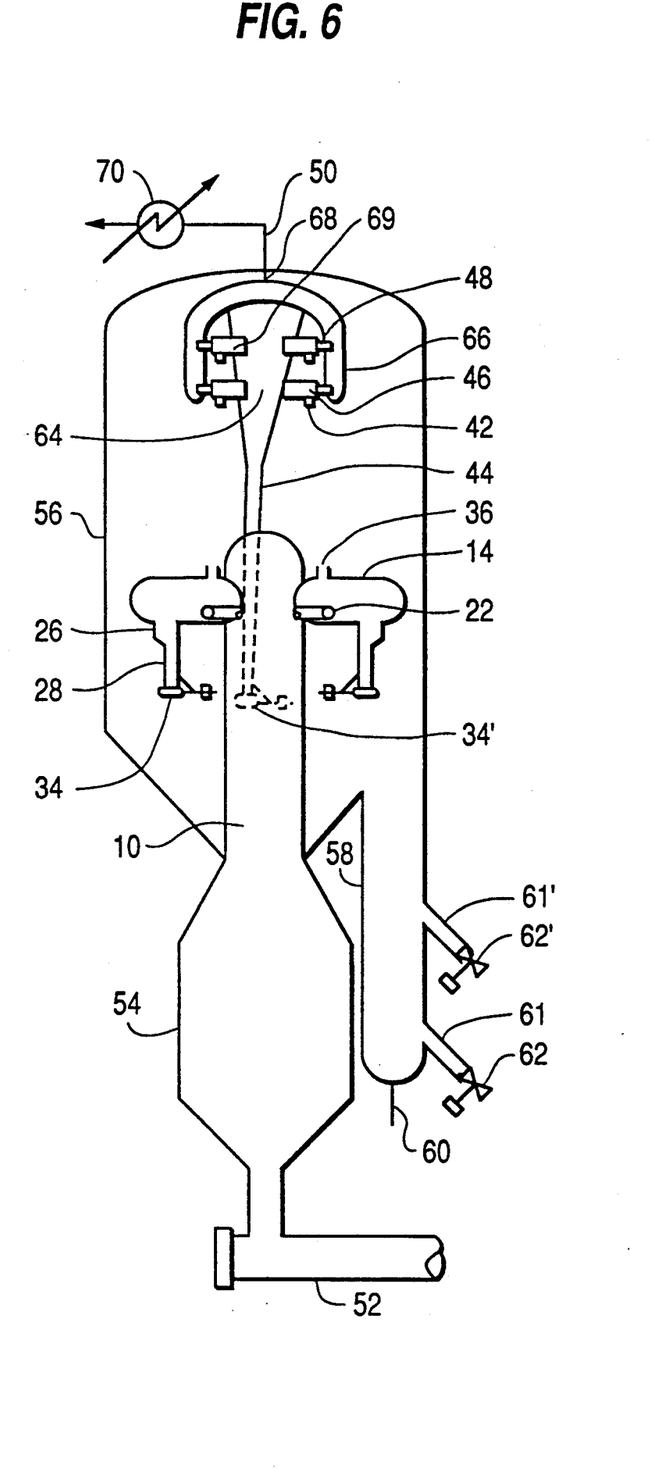
FIG. 6 schematically illustrates a MSCC unit catalyst regenerator employing a plurality of the ballistic separator chambers of FIG. 3 in conjunction with a secondary separator chamber of the type shown in FIG. 5, but provided with vertical multi-cyclones therein.
Figure 7:
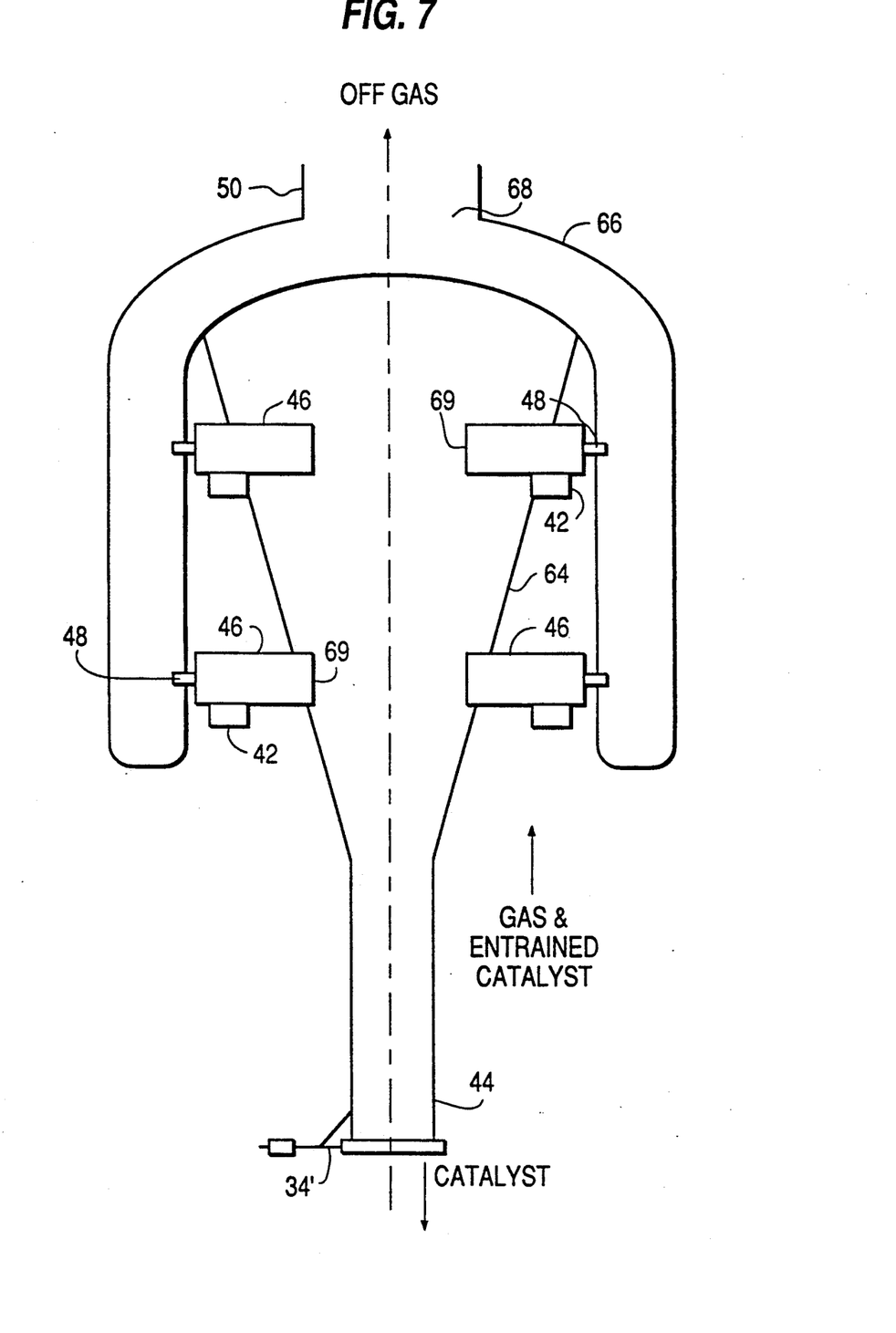
FIG. 7 is an enlarged view of the secondary separator system of FIG. 6.

Another especially preferred embodiment of the present invention is shown in FIGS. 6 and 7 wherein one or more, preferably a plurality of the above-described ballistic separation chambers 14 are installed adjacent the upper end of a vertically extending transport riser 10 which may be either internal or external of a process vessel. In such embodiment gas and entrained solids flow upwardly in, for example, a fluid bed reactor or regenerator, and pass from the upper portion thereof into the primary inlet of each of a plurality of ballistic separation chambers 14 circumferentially spaced around the shell of the riser and radially intending therefrom. A major portion of the entrained particulate solids is separated as described hereinabove in chambers 14 and passed downwardly from the bottoms of the chambers, for return to the source vessel, while the gas and remaining entrained solids are passed upwardly from the tops of the chambers 14 for passage into cyclones from which the substantially solids-free off-gas is discharged to the atmosphere, and the separated solids are returned to the source vessel. In such an arrangement the cyclones may be of the conventional type, for example conventional two-stage large vertical-type cyclones, or horizontal or vertical small multi-cyclones may be used.

Referring to FIG. 6, for the purpose of exemplification, there is depicted this latter embodiment of the invention for use in a catalyst regenerator of a MSCC cracking unit, although it is to be understood that it may also be used in FCC reactors and other fluidized bed process units. Combustion air and spent catalyst from an FCC reactor flows through transport line 52, into the bottom portion of regenerator 54 and upwardly in regenerator 54. Carbonaceous deposits on the catalyst particles are burned off in the transport line and regenerator to regenerate the catalyst and restore its activity so that the regenerated catalyst may be returned to the reactor for further use. Hot catalyst particles, combustion air and combustion products rise in the regenerator, into regenerator riser 10 extending upwardly from the main body of the regenerator, and to the top-most portion of the riser where the gas and entrained solids enter primary inlet means 22 into each of primary ballistic separator chambers 14. In chambers 14 a major portion of the entrained solids is separated from the gas, as described with respect to FIGS. 1-3 and discharged from chambers 14 through primary solid particle outlet means 26 positioned in the bottoms of each of chambers 14 and into solids withdrawal line 28 extending downwardly from chamber 14. Line 28 preferably has a cross-sectional flow area at its upper end connected to primary solids outlet 26 which about 10 times the cross-sectional flow area of the lower end to aid in de-gassing the separated catalyst passing downwardly in line 28. Each line 28 serves as a dipleg and is sealed at the bottom with a counter-weighted flapper valve 34 which permits the separated regenerated catalyst to drop into a lower region of regenerator cyclone vessel 56 which encloses the separation system positioned at tho top end portion of regenerator riser 10, while preventing gas in vessel 56 from flowing into chambers 14. The separated regenerated catalyst then passes into a stripper section 58 and flows downwardly therein where it is stripped of entrained flue gas with steam introduced through line 60. Stripped regenerated catalyst is then returned to the reactor at one or more locations through lines 61, 61' and slide valves 62, 62'.

Separated gas containing a minor portion of the entrained catalyst is discharged from each of chambers 14 through primary gas outlet means 36 positioned in the upper portion of chamber 14 into the upper portion of cyclone vessel 56 from which the gas and solids flow into the preferred embodiment of an internal secondary separator as shown in FIG. 6 and detailed in FIG. 7. This unique system is much different then the Europis or EMTROL system depicted in FIG. 5 in that this multi-cyclone system is incorporated inside an operating process vessel 56, not a separate vessel, the gas inlet is from the bottom and in complete flow communication with the level in the bottom of vessel 56, there is only one catalyst/solids outlet line 44, and the annular area around the off-gas collector housing 66 and the body of the catalyst outlet vessel 64 decreases from the bottom to the top of vessel 64. The gas and solids from the primary separator enter the secondary separator from the bottom and flow upwardly into the gas inlets 42 of a plurality of horizontal multi-cyclones 46, of the type described hereinabove, for removing substantially all of the remaining entrained catalyst from the flue-gas. The cleansed flue gas exits the secondary separator through multi-cyclone outlets 48 for discharge to the atmosphere through off-gas collector housing 66 and off-gas outlet 68 connected to flue gas line 50. The catalyst separated in the secondary separator exits the multi-cyclones 46 through catalyst discharge opening 69 into catalyst outlet vessel 64.

Off-gas collector housing 66, which has the form of an inverted cup, is positioned over the top of vessel 64 and has vertical walls extending downwardly around the body of catalyst outlet vessel 64. Preferably, the top head of vessel 64 also forms the inner wall of the top portion of housing 66, and the outer wall of such top portion is provided with an off-gas outlet 68 connected to off-gas line 50.

A plurality of horizontal multi-cyclones 46 are spaced around the circumference of catalyst outlet vessel 64 at one or more elevations along the height of vessel 64. Each multi-cyclone is provided with a secondary gas inlet 42 on the bottom thereof, a secondary gas outlet means 48 in flow communication with the interior of housing 66 and a secondary solids outlet 69 in flow communication with the interior of catalyst outlet vessel 64. Preferably, as shown in FIG. 7, multi-cyclones 46 are arranged horizontally, and gas outlets 48 and solid outlets 69 are positioned at opposite ends of cyclones 46.

In operation, the separated gas containing a minor amount of the total entrained solids exits from primary gas outlets 36, rises in cyclone vessel 56 and flows through multi-cyclone inlets 42 into multi-cyclones 46 which separate substantially all of the remaining entrained solids from the gas. The thus-cleansed gas flows horizontally through secondary gas outlets 48 into gas collector housing 66, rises and exits through off-gas outlet 68 into off-gas line 50, after which it may be cooled by heat-exchange 70. Separated solids are discharged horizontally from cyclones 46 through solids outlets 69 and pass to the interior of catalyst outlet vessel 64 wherein they fall to the bottom thereof and pass downwardly through dipleg 44 and flapper valve 34' into a lower region of regenerator cyclone vessel 56. Preferably, flapper values 34 and 34' are at the same elevation.

The latter-described arrangement of the secondary separation system is especially advantageous for enabling the use of multicyclones in new or existing vessels that contain a fluid bed or transport line riser system that terminates in a rough cut fluidized solids separation device which reduces the catalyst loading to the multi-cyclones to less than about 0.5 pounds per cubic foot of gas. By using cyclones of 20 inches diameter or more, the catalyst attrition is greatly reduced, while retaining higher separator efficiency than for conventional separation technology.

Further, if one were to design a catalyst regenerator producing 6 wt. % coke for 50,000 BPD MSCC Cracking Unit using a conventional two-stage cyclone system in the regenerator upper cyclone vessel, the internal diameter (ID) of this upper vessel would be about 34 feet, with a tangent-to-tangent (T—T) length of about 45 feet. By using the primary ballistic separator and secondary separator system described herein the catalyst regenerator ID can be decreased to about 23 feet and its T—T length can be decreased to about 36 feet. Correspondingly, in the reactor for such a unit, the T—T length can be reduced from about 45 feet to about 24 feet, while maintaining a reactor diameter about the same as that of a unit using conventional separation technology.

Thus, use of the present invention permits better separation efficiency and more capacity in an existing FCC unit or lower cost in a new FCC unit.

The present invention has been described in terms of preferred embodiments thereof for the purpose of illustration; however, modifications and variations falling within the spirit of the invention may become apparent to one skilled in the art, and the scope of the invention is to be determined by the appended claims and their equivalents.

What is claimed is:

1. Apparatus for separating particulate solids from a process gas stream, which apparatus comprises:
   (a) a primary inlet means for introducing into said apparatus a process gas stream containing entrained solid particles received from a source vessel;
   (b) a primary ballistic separation chamber in flow communication with said primary inlet means for receiving said gas stream and entrained solid particles introduced thereinto and effecting therein a ballistic separation of a portion of said solid particles from said process gas; said primary separation chamber comprising; (1) a first chamber portion having a first end portion in which said primary inlet means is positioned and (2) a second chamber portion joined to and in flow communication with said first chamber portion, having a cross sectional flow area greater than that of said first chamber portion and a primary gas outlet means and a second end portion;
   (c) a secondary separator chamber for receiving a process stream containing a portion of said solid particles from said second chamber portion, said secondary separator chamber having a secondary inlet means connected to said primary gas outlet means and providing direct flow communication between said secondary separator chamber and said second chamber portion;
   (d) a plurality cyclone separators positioned within said secondary separator chamber for receiving process gas and entrained solid particles entering said secondary separator chamber and for separating substantially all of said solid particles in the process gas entering said secondary separator chamber;
   (e) a secondary solid particle outlet means in said secondary separation chamber for removal of solid particles separated from process gas by said cyclone separators;
   (f) off-gas outlet means in said secondary separator chamber for removing therefrom process gas substantially free of said solid particles;
   (g) primary solid particle outlet means in said second chamber portion for removal of a portion of said solid particles separated from said process gas in said primary separation chamber.

2. The apparatus of claim 1, wherein each of said first and second chamber portions is an elongated horizontal conduit, said primary solid particle outlet means is positioned in a lower portion of said second chamber portion intermediate the junction of said first and second chamber portions and a second end portion of said second chamber portion and said secondary inlet means is positioned adjacent a lower portion of said second chamber portion intermediate said primary inlet means and said primary solid particle outlet means.

3. The apparatus of claim 1, which further includes a baffle internal of said primary separation chamber and positioned between said primary inlet means and said secondary inlet means.

4. The apparatus of claim 3, wherein said baffle extends in said primary separation chamber from said first chamber portion and past said secondary inlet means.

5. The apparatus of claim 1, which further includes conduit means connecting each of said primary and secondary solid particle outlet means to said source vessel for returning separated solid particles to said source vessel.

6. The apparatus of claim 2, wherein said secondary separation chamber is positioned below said second chamber portion, said secondary inlet means is positioned intermediate an upper portion of said secondary separator chamber and said second chamber portion, and said cyclone separators are arranged horizontally in said secondary separation chamber below said secondary inlet means.

7. The apparatus of claim 1, wherein said primary inlet means is above said primary solid particle outlet means.

8. The apparatus of claim 5, wherein said apparatus is positioned external of said source vessel.

9. The apparatus of claim 5, wherein said apparatus is positioned in said source vessel.

10. The apparatus of claim 6, wherein said secondary separator chamber extends downwardly, said off-gas outlet means is positioned in an upper portion thereof and said secondary solid particle outlet means is positioned in a lower portion thereof.

11. The apparatus of claim 1, further including a conduit connected to said primary solid particle outlet means and extending downwardly therefrom, wherein said conduit has an upper portion adjacent the connection to said primary particle outlet means and a lower portion, said upper portion having a first cross-sectional flow area, and said lower portion having a second cross-sectional flow area smaller than said first cross-sectional flow area.

12. The apparatus of claim 11, wherein said second cross-sectional flow area is about 1/10 that of said first cross-sectional flow area.

13. The method of separating solid particles entrained in a process gas stream and producing an off gas stream substantially free of solid particles, which method comprises:

(a) introducing a stream of a process gas containing entrained solid particles from a process source into a first chamber portion of a primary ballistic separation chamber and subsequently passing said gas and solid particles into a second chamber portion of said separation chamber having a cross-sectional flow area greater than that of said first chamber portion;

(b) separating a major portion of said solid particles from the process gas by gravity in said primary separation chamber;

(c) passing a process gas stream containing a minor portion of said solid particles from said second chamber portion to a plurality of cyclone separators in a secondary separator chamber and separating therein substantially all of said solid particles in the process gas passed into said secondary separator chamber;

(d) passing from said secondary separator chamber an off-gas stream comprising process gas substantially free of said solid particles and a second stream comprising separated solid particles; and (e) passing from said second chamber portion a third stream comprising said major portion of said solid particles separated from said process gas stream.

14. The method of claim 13, wherein said stream of process gas containing solid particles is introduced horizontally into said first chamber portion.

15. The method of claim 14, wherein said third stream passes downwardly from said second chamber portion and is returned to said process source.

16. The method of claim 14, wherein said second stream passes downwardly from a lower portion of said secondary separator chamber and is returned to said process source.

17. The method of claim 14, wherein said off gas stream passes upwardly from an upper portion of said secondary separator chamber.

18. The method of claim 13, wherein said process source is a processing unit selected from the group consisting of at least one of a fluidized combustion process unit, a fluidized catalytic cracking process unit and a fluidized separation process unit.

19. The method of claim 13, wherein the velocity of said process gas stream containing entrained solid particles introduced into said first chamber portion is from about 40 to about 150 feet per second.

20. The method of claim 13, wherein said process gas stream containing solid particles introduced into said first chamber portion contains not more than about 2 pounds of solid particles per cubic foot thereof.

21. The method of claim 13, wherein said process gas stream containing said minor portion of said solid particles contains not more than about 0.5 pound of solid particles per cubic foot thereof.

22. The method of claim 13, wherein said off gas stream contains not more than about 0.0005 pound of solid particles per cubic foot thereof.

23. The method of claim 13, wherein said third stream is passed downwardly from said second chamber portion through a conduit having a cross-sectional flow area which decreases from the upper end of the conduit toward the lower end thereof.

24. The method of claim 23, wherein the cross-sectional flow area at the lower end of said conduit is about 1/10 that of the upper end of the conduit.

25. A ballistic separation chamber for separating particulate solids from a process gas stream, which chamber comprises;

(a) a first chamber portion having a first end portion in which there is positioned an inlet means for introducing thereinto a process gas stream containing entrained solid particles;

(b) a second chamber portion joined to and in flow communication with said first chamber portion so as to provide in said chamber a flow path extending from said inlet means toward a second portion, said second chamber portion having a cross sectional flow area greater than that of said first chamber portion and having said second end portion spaced downstream from the junction of said first and second chamber portions;

(c) solid particle outlet means positioned in said second chamber portion for removing therefrom a stream rich in solid particles;

(d) gas outlet means positioned in said separation chamber intermediate said inlet means and said solid particle outlet means for removing therefrom a stream rich in process gas; and (e) baffle means arranged in said separation chamber between said inlet means and said gas outlet means for directing the process gas stream and entrained solid particles introduced through said inlet means along said flow-path past said gas outlet means.

26. The separation chamber of claim 25, wherein each of said first and second chamber portions is an elongated horizontal conduit, and each of said solid particle outlet means and said gas outlet means is positioned in a lower portion of said second chamber portion.

27. The separation chamber of claim 25, wherein each of said first and second chamber portions is an elongated horizontal conduit, said solid particle outlet means is positioned in a lower portion of said second chamber portion, said horizontal conduit is formed into an arc and said primary gas outlet means is positioned adjacent the inside of said arc.

28. The separation chamber of claim 25, wherein at least a portion of one of said first and second chamber portions is an elongated horizontal conduit formed into an arc and said gas outlet means is positioned adjacent the inside of said arc.

29. The separation chamber of claim 28, wherein said first and second chamber portions are each formed into an arc.

30. The apparatus of claim 1, wherein each of said first and second chamber portions is an elongated horizontal conduit, said primary solid particle outlet means is positioned in a lower portion of said second chamber portion and said secondary inlet means is positioned adjacent an upper portion of said second chamber portion intermediate said primary inlet means and said primary solid particle outlet means.

31. The apparatus of claim 1, wherein at least a portion of one of said first and second chamber portions is an elongated conduit and said gas outlet means is positioned in an upper portion of said second chamber portion.

32. The method of separating solid particles entrained in a process gas stream and producing a gas stream having a reduced solid particle content, which method comprises:

(a) introducing a stream of a process gas containing entrained solid particles into a first chamber portion of a ballistic separation chamber at a first velocity;

(b) passing said stream into a second chamber portion of said separation chamber and reducing the velocity thereof to a value lower than said first velocity so as to separate a major portion of said solid particles from said process gas in said second chamber portion;

(c) withdrawing said major portion of separated solid particles from a lower portion of said second chamber portion; and (d) withdrawing a process gas stream containing a minor portion of said solid particles from said second chamber portion.

33. The method of claim 32, wherein said process gas stream containing entrained solid particles is passed through at least a portion of said separation chamber along a flow line forming an arc so as to enhance the separation of said solid particles from said process gas by centrifugal force.

34. The method of claim 32, wherein said process gas stream containing a minor portion of said solid particles is withdrawn from a lower portion of said second chamber portion.

35. Apparatus for separating entrained particulate solids from a fluidizing gas, which apparatus comprises:

(a) primary separation means from separating a major portion of said entrained solids from said gas and producing an upwardly flowing primary separated gas containing a remaining minor portion of said entrained solids, said primary separation means comprising one or more horizontal ballistic separation chambers; and (b) secondary separation means positioned above said primary separation means for receiving said primary separated gas, removing substantially all of said remaining solids from said primary separated gas and producing an off-gas having a reduced solids content, said secondary separation means including an off-gas collector housing having an off-gas outlet for discharging said gas substantially free of said solids.

36. The apparatus of claim 35, wherein said secondary separation means includes one or more horizontal cyclones each having a secondary gas inlet for receiving said primary separated gas, a secondary gas outlet in flow communication with said off-gas collector housing and a secondary solids outlet for discharging therefrom substantially all of said remaining solids.

37. The apparatus of claim 36, further including a vertically extending particulate solids outlet vessel in flow communication with each of said secondary solids outlets for receiving said remaining solids separated in said secondary separator.

38. The apparatus of claim 35, wherein said one or more horizontal ballistic separation chambers each comprises:

(a) a first chamber portion having a first end portion in which there is positioned an inlet means for introducing thereinto a process gas stream containing entrained solid particles;

(b) a second chamber portion joined to and in flow communication with said first chamber portion so as to provide in said chamber a flow path extending from said inlet means toward a second portion, said second chamber portion having a cross sectional flow area greater than that of said first chamber portion and having said second end portion spaced downstream from the junction of said first and second chamber portions;

(c) solid particle outlet means positioned in said second chamber portion for removing therefrom a stream rich in solid particles;

(d) gas outlet means positioned in said separation chamber intermediate said inlet means and said solid particle outlet means for removing therefrom a stream rich in process gas; and (e) baffle means arranged in said separation chamber between said inlet means and said gas outlet means for directing the process gas stream and entrained solid particles introduced through said inlet means along said flow-path past said gas outlet means.

39. The apparatus of claim 35, further including a cyclone vessel enclosing said primary separation means and said secondary separation means.

40. The apparatus of claim 35, further including a vertical riser having a top-most portion, and wherein said primary separation means is positioned adjacent said top-most portion and is in flow communication with the interior of said riser.

41. The apparatus of claim 40, wherein said primary separation means comprises a plurality of said horizontal ballistic separation chambers spaced around the circumference of said riser and extending radially therefrom each of ballistic separation chambers comprising:
  (a) a first chamber portion having a first end portion in which there is positioned an inlet means for introducing thereinto a process gas stream containing entrained solid particles;
  (b) a second chamber portion joined to and in flow communication with said first chamber portion so as to provide in said chamber a flow path extending from said inlet means toward a second portion, said second chamber portion having a cross sectional flow area greater than that of said first chamber portion and having said second end portion spaced downstream from the junction of said first and second chamber portions;
  (c) solid particle outlet means positioned in said second chamber portion for removing therefrom a stream rich in solid particles;
  (d) gas outlet means positioned in said separation chamber intermediate said inlet means and said solid particle outlet means for removing therefrom a stream rich in process gas; and
  (e) baffle means arranged in said separation chamber between said inlet means and said gas outlet means for directing the process gas stream and entrained solid particles introduced through said inlet means along said flow-path past said gas outlet means.

42. The apparatus of claim 37, wherein said off-gas collector housing has a cup-shaped configuration and is positioned over said particulate solids outlet vessel.

43. Apparatus for separating entrained solid particulates from a gaseous fluidizing media, which apparatus comprises;
  (a) an enclosed vertically extending conical vessel having an upper portion, a lower portion, and a side wall converging inwardly from said upper portion to said lower portion;
  (b) a cup-shaped enclosed vessel having an inner wall and an outer wall spaced therefrom, said cup-shaped vessel being fitted over said upper portion and extending downwardly around the side wall of said conical vessel and having a gas outlet in said outer wall above said upper portion of said conical vessel for discharging separated gas; and
  a plurality of multi-cyclones spaced circumferentially around said side wall of said conical vessel for separating said solid particulates and gaseous media, said cyclones having an inlet for receiving a stream of said gaseous media and entrained particulate solids, a gas outlet in flow communication with the interior of said cup-shaped vessel for discharging separated gas into said cup-shaped vessel, and a solids outlet in flow communication with the interior of said conical vessel for discharging separated particulate solids into said conical vessel.

44. The apparatus of claim 43, further including a conduit joined to and extending coaxially from said lower portion of said conical vessel and a valve means on one end of said conduit opposite the junction of said lower portion and said conduit.

45. The apparatus of claim 43, wherein a portion of said inner wall of said cup-shaped vessel forms a top head of said conical vessel.

46. The apparatus of claim 43 wherein said multi-cyclones are of the horizontal type and extend radially between said side wall of said conical vessel and said inner wall of said cup-shape vessel.

47. The apparatus of claim 36, further including a conical, vertically extending particulate solids outlet vessel in flow communication with each of said secondary outlets and wherein said off-gas collector focusing is a cup-shaped vessel and is positioned over said particulate solids outlet vessel.

48. The apparatus of claim 1, wherein each of said first and second chamber portions is an elongated vertical conduit, and said primary solid particle outlet means is positioned below said second chamber inlet at said second end portion.

49. The apparatus of claim 48, wherein said secondary inlet means is positioned horizontally between said primary inlet means and said primary solid particle outlet means.

50. The separation chamber of claim 25, wherein each of said first and second chamber portions is an elongated vertical conduit, said solid particle outlet means is positioned below the second chamber inlet and said gas outlet means is positioned horizontally between said primary inlet means and said primary solid particle outlet means.

51. The method of claim 32, wherein each of said first and second chamber portions is an elongated vertical conduit.

* * * * *